(12) United States Patent
Henderson

(10) Patent No.: US 10,388,191 B2
(45) Date of Patent: *Aug. 20, 2019

(54) WATER-ACTIVATED LINERLESS ADHESIVE ARTICLES AND RELATED METHODS

(71) Applicant: Avery Dennison Corporation, Glendale, CA (US)

(72) Inventor: Kevin O. Henderson, Willoughby Hills, OH (US)

(73) Assignee: Avery Dennison Corporation, Glendale, CA (US)

(*) Notice: Subject to any disclaimer, the term of this patent is extended or adjusted under 35 U.S.C. 154(b) by 506 days.

This patent is subject to a terminal disclaimer.

(21) Appl. No.: 14/971,053

(22) Filed: Dec. 16, 2015

(65) Prior Publication Data

US 2016/0186013 A1 Jun. 30, 2016

Related U.S. Application Data

(60) Provisional application No. 62/097,696, filed on Dec. 30, 2014.

(51) Int. Cl.
*G09F 3/02* (2006.01)
*C09J 7/20* (2018.01)
(Continued)

(52) U.S. Cl.
CPC .............. *G09F 3/02* (2013.01); *B05D 7/54* (2013.01); *B65C 9/0015* (2013.01); *C09J 5/00* (2013.01);
(Continued)

(58) Field of Classification Search
CPC ...... C09J 7/0217; C09J 7/385; C09J 2433/00; C09J 2201/16; C09J 2201/606;
(Continued)

(56) References Cited

U.S. PATENT DOCUMENTS 1,800,194 A * 4/1931 Fischer ................. C04B 41/009
428/40.3
4,844,828 A * 7/1989 Aoki .................... C11D 17/044
510/296

(Continued)

FOREIGN PATENT DOCUMENTS

CN 1198714 4/2005
CN 201219012 4/2009
(Continued)

OTHER PUBLICATIONS

International Search Report and Written Opinion dated Apr. 6, 2016 issued in corresponding IA No. PCT/US2015/066018 filed Dec. 16, 2015.

(Continued)

*Primary Examiner* — Scott R. Walshon
(74) *Attorney, Agent, or Firm* — Avery Dennison Corporation

(57) ABSTRACT

Water-activatable, linerless adhesive articles and related methods are described. The adhesive articles utilize a dry, non-tacky protective layer for protecting the adhesive layer from contamination and therefore do not require a release liner. The protective layer includes at least one of amorphous polyvinyl alcohol and poly(ethylene oxide). The adhesive articles are bonded to a substrate by applying a polar solvent, such as water, to the protective layer, which mix to form a tacky material. The tacky material forms a weak, temporary bond with the substrate and allows the adhesive articles to be repositioned on the substrate. The tacky material gradually pools together at the substrate/adhesive article interface to expose the underlying adhesive layer. The exposed adhesive layer then forms a permanent bond with the substrate.

53 Claims, 4 Drawing Sheets

(51) Int. Cl.
*C09J 5/00* (2006.01)
*B05D 7/00* (2006.01)
*B65C 9/00* (2006.01)

(52) U.S. Cl.
CPC ......... *C09J 7/20* (2018.01); *B65C 2009/0018* (2013.01); *C09J 2201/28* (2013.01); *C09J 2201/606* (2013.01); *C09J 2203/334* (2013.01); *C09J 2429/001* (2013.01); *C09J 2429/005* (2013.01); *C09J 2433/00* (2013.01)

(58) Field of Classification Search
CPC .............. C09J 2203/334; C09J 2429/00; C09J 2429/005; C09J 129/02; C09J 129/04; B05D 7/54; B65C 9/0015; B65C 2009/0018; G09F 3/02; G09F 3/10; G09F 2003/023; G09F 2003/0273
See application file for complete search history.

(56) References Cited

U.S. PATENT DOCUMENTS

| | | |
|---|---|---|
| 5,569,515 A | 10/1996 | Rice, II et al. |
| 6,306,242 B1 | 10/2001 | Dronzek |
| 6,517,664 B1 | 2/2003 | Dronzek, Jr. |
| 6,663,746 B2 | 12/2003 | Dronzek |
| 7,090,740 B2 | 8/2006 | Dronzek |
| 7,828,923 B2 | 11/2010 | Patel |
| 7,939,145 B2 | 5/2011 | Dronzek, Jr. |
| 8,334,335 B2 | 12/2012 | Lux et al. |
| 8,334,336 B2 | 12/2012 | Lux et al. |
| 8,716,372 B2 | 5/2014 | Lux et al. |
| 8,716,389 B2 | 5/2014 | Lux et al. |
| 2008/0108748 A1* | 5/2008 | Buckley ................. C08L 29/04 524/612 |
| 2012/0061014 A1* | 3/2012 | Patel ......................... C09J 7/38 156/192 |
| 2012/0276381 A1 | 11/2012 | Cypcar |
| 2013/0171444 A1 | 7/2013 | Cho et al. |
| 2014/0045976 A1 | 2/2014 | Lux et al. |
| 2014/0065334 A1 | 3/2014 | Henderson et al. |

FOREIGN PATENT DOCUMENTS

| | | |
|---|---|---|
| CN | 201258141 | 6/2009 |
| CN | 100560359 | 11/2009 |
| CN | 201506537 | 6/2010 |
| CN | 101638159 | 4/2011 |
| CN | 101360604 | 10/2011 |
| CN | 202319164 | 7/2012 |
| CN | 203311746 | 11/2013 |
| CN | 103465531 | 12/2013 |
| CN | 103826854 | 5/2014 |
| CN | 102317394 | 6/2014 |
| CN | 102825877 | 1/2015 |
| CN | 106336822 | 1/2017 |
| EP | 0747871 | 12/1996 |
| EP | 1426403 | 6/2004 |
| JP | 2006312313 A * | 11/2006 |
| JP | 2013144791 A * | 7/2013 |
| WO | 90/01764 | 2/1990 |

OTHER PUBLICATIONS

International Preliminary Report on Patentability dated Jul. 13, 2017 issued in corresponding IA No. PCT/US2015/066018 filed Dec. 16, 2015.

* cited by examiner

WATER-ACTIVATED LINERLESS ADHESIVE ARTICLES AND RELATED METHODS

CROSS-REFERENCE TO RELATED APPLICATION

The present application claims the benefit of U.S. Provisional Application No. 62/097,696 filed Dec. 30, 2014, which is incorporated herein by reference in its entirety.

FIELD

The present subject matter relates to water-activated adhesive articles and related methods that do not require release liners.

BACKGROUND

Adhesive articles typically include release liners covering an adhesive layer for protecting the adhesive layer from contamination from dirt, moisture, or the like, prior to the adhesive articles being applied to a substrate. Typical release liners are paper or polymeric structures that have no practical use once they are removed from the adhesive article. Typically, such release liners are simply discarded in the trash and end up in landfills, thereby causing strain on the environment.

Ordinarily, release liners utilize silicone-containing and fluorine-containing materials as a release agent. The silicone-containing or fluorine-containing component of the release liner contacts the adhesive layer and allows the release liner to separate easily from the adhesive layer when the adhesive article is needed for use. The silicone-containing or fluorine-containing material does not strongly adhere to the adhesive and thus provides a releasable interface with the underlying adhesive, while providing protection from contamination.

Adhesive articles that do not include a release liner covering the adhesive layer are known, and are herein referred to as "linerless" adhesive articles. Typically, a linerless adhesive article includes an adhesive layer on a first side of a facestock and a silicone-containing and fluorine-containing material on a second side of the facestock. The adhesive article is rolled upon itself, or stacked on other similar articles, such that the adhesive layer contacts the silicone-containing or fluorine-containing material on the second side of the facestock. In these configurations, the facestock including the silicone-containing or fluorine-containing material acts as the release liner for the adhesive layer.

Problems associated with typical release liners or facestock coated with silicone-containing and fluorine-containing material are that they are not recyclable due to silicon and fluorine contamination. Such material is only suitable for the landfill and contributes significantly to environmental concerns. Furthermore, occasional transfer of material containing a silicon or fluorine component to the substrate can interfere with proper adhesion, can cause printing problems for adhesive labels, or can result in other similar difficulties.

Accordingly, there exists a need for an improved linerless adhesive article and related methods that does not incorporate a release liner and do not incorporate silicone-containing and fluorine-containing material.

SUMMARY

The difficulties and drawbacks associated with previously known release liners and strategies are addressed in the present water-activated linerless adhesive articles and related methods.

The present subject matter relates to water-activated adhesive articles that do not include release liners. The present subject matter also relates to methods of bonding an adhesive article to a substrate and methods of making adhesive articles that do not require the use of a release liner for protecting the adhesive layer.

In one aspect, the present subject matter provides a water-activatable adhesive article comprising a facestock, an adhesive layer disposed on the facestock, and an amorphous polyvinyl alcohol covering at least a portion of the adhesive layer. The amorphous polyvinyl alcohol is in a dry form and is non-tacky, and protects the covered portion of the adhesive layer from exposure to contamination. Contacting a solvent to the amorphous polyvinyl alcohol results in the covered portion of the adhesive layer being at least partially exposed.

In another aspect, the present subject matter provides a method for bonding an adhesive article to a substrate. The adhesive article includes a facestock, an adhesive layer disposed on the facestock, and an amorphous polyvinyl alcohol layer disposed on the adhesive layer. The amorphous polyvinyl alcohol layer is for protecting the adhesive layer from exposure to contamination. The polyvinyl alcohol layer is in dry form and is non-tacky. The method comprises contacting a polar solvent to the amorphous polyvinyl alcohol layer to expose at least a portion of the adhesive layer. The adhesive article is bonded to the substrate with the exposed portion of the adhesive layer.

In still another aspect, the present subject matter provides a method for adhering an adhesive article to a substrate. The adhesive article includes a facestock, an adhesive layer disposed on the facestock, and an amorphous polyvinyl alcohol layer covering the adhesive layer for protecting the adhesive layer from exposure to contamination. The polyvinyl alcohol layer is in dry form and is non-tacky. The method comprises applying a polar solvent to the amorphous polyvinyl alcohol layer to form a tacky material comprising amorphous polyvinyl alcohol in the polar solvent. The tacky material is contacted to the substrate to form a temporary and releasable bond between the adhesive article and the substrate. The method includes determining an alignment of the adhesive article with respect to the substrate compared to a desired alignment, and repositioning the adhesive article on the substrate if the adhesive article is determined to be misaligned with respect to the desired alignment.

In yet another aspect, the present subject matter provides a labeled substrate comprising a substrate including a surface, and a label bonded to the surface. The label comprises a facestock, an adhesive layer, and amorphous polyvinyl alcohol at an interface between the adhesive layer and the surface.

In another aspect, the present subject matter provides a method of making a linerless, water-activatable adhesive article. The method comprises providing a facestock and applying a layer of adhesive to the facestock. A layer of dry amorphous vinyl alcohol polymer is formed on the layer of adhesive.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely

DETAILED DESCRIPTION OF THE EMBODIMENTS

Figure 1:
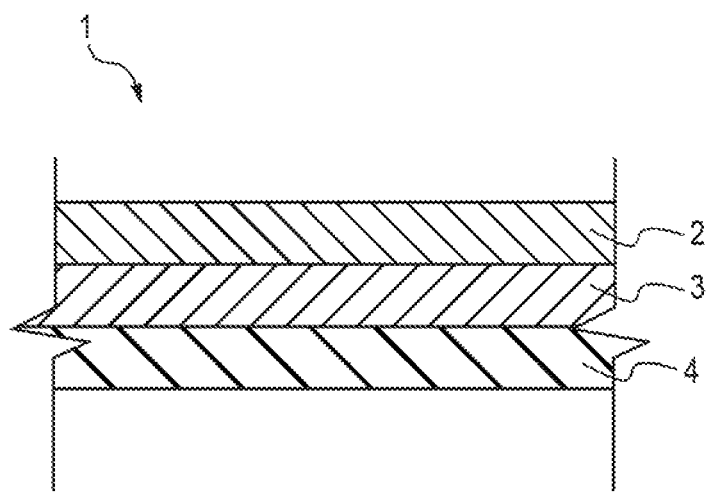
FIG. 1 is a schematic, cross sectional view of an adhesive article in accordance with the present subject matter.

The subject matter described herein provides water-activatable adhesive articles with no release liner and provides methods of adhering adhesive articles to substrates. Exemplary adhesive articles comprise a facestock, an adhesive layer disposed on the facestock, and a water-activated protective layer covering the adhesive layer. In one embodiment, the water-activated protective layer comprises poly(ethylene oxide) (PEO), an amorphous vinyl alcohol polymer, or a combination thereof. As used herein, poly(ethylene oxide) relates to a polymer of H—(O—CH$_2$—CH$_2$)$_n$—OH having a molecular mass above 20,000 g/mol. As used herein, "vinyl alcohol polymer" and "polyvinyl alcohol/(PVOH)" are used interchangeably and refer to a constituent or layer as indicated. In several embodiments, the constituents (e.g. amorphous PVOH and/or PEO) of the protective layer are in dry form and substantially non-tacky, and thus act to protect the adhesive layer by inhibiting contamination of the adhesive layer from exposure to dirt, moisture, radiation, or the like which may reduce the level of tack of the adhesive layer.

In accordance with the present subject matter, the adhesive article in general, and the protective layer in particular, are said to be "water-activatable" or "water-activated" because water is used to contact the protective layer to form a tacky material for creating an initial, relatively weak bond with a substrate, and also is used to expose the underlying adhesive layer for creating a secondary, stronger bond with the substrate. It will be understood that "water-activatable" also incorporates labels and methods that use other polar solvents to activate the adhesive articles and protective layers.

While not being bound to any particular theory, it is believed that the tacky material that forms when water or other polar solvent is contacted to the protective layer, comprises a suspension or solution of the constituents of the protective layer in water, or a combination thereof. For example, if the protective layer comprises amorphous PVOH, the tacky material can comprise a suspension of amorphous PVOH in water, a solution of amorphous PVOH at least partially dissolved in water, or a combination thereof. The same is true if the protective layer comprises PEO, such that the tacky material can comprise a suspension of PEO in water, a solution of PEO at least partially dissolved in water, or a combination thereof. The suspension/solution is slightly tacky for making an initial bond with the substrate. Additionally, it is believed that the tacky material puddles, coalesces, or otherwise agglomerates into discrete pools at the interface between the substrate and the adhesive article. Such pooling of the tacky material thereby exposes the underlying adhesive layer for making the secondary bond with the substrate.

In this regard, the water may act as a vehicle for altering the protective layer from an original state and configuration of being dry and uniformly coating the adhesive layer, to an altered state and configuration of being wet (i.e. in solution or in suspension) and pooled at discrete locations at the interface between the substrate and the adhesive article. Such pooling of the tacky material exposes the previously-covered adhesive layer.

The tacky material can be used to form an initial, relatively weak adhesive bond with a substrate that is temporary, releasable, and/or repositionable. In this way, the adhesive article can be removably bonded to a substrate using the tacky material, and repositioned on the substrate as desired. As the adhesive layer is exposed by pooling of the tacky material, the adhesive layer may gradually form a secondary, more durable and stronger bond with the substrate compared to the initial bond formed by the tacky material.

Additionally, the tacky material at the adhesive article/substrate interface may also dry, wherein the water is substantially removed from the tacky material, and the dried constituents, e.g. amorphous vinyl alcohol polymer and/or PEO, will remain at discrete locations at the interface.

During pooling and drying of the tacky material, the bond between the adhesive article and the substrate may transition from being made by the tacky material, which provides a temporary and repositionable bond, to being made by the exposed adhesive layer, which provides a stronger and more durable bond.

The present subject matter will now be explained in more detail in reference to the accompanying figures, wherein identical reference numbers among the figures represent similar features between the different embodiments.

FIG. 1 depicts an adhesive article 1 in accordance with the present subject matter. The adhesive article 1 comprises a facestock 2 having an adhesive layer 3 disposed thereon. A protective layer 4 is shown to cover the adhesive layer 3. Generally, the adhesive article 1 is free of release liner(s).

The dry, non-tacky constituents, e.g. amorphous vinyl alcohol polymer and/or PEO, act as a protective layer for the adhesive layer 3. The dry protective layer 4 may obviate the need for a traditional release liner, which is typically used to protect an adhesive layer from premature exposure to a substrate or environmental contamination.

Figure 2:
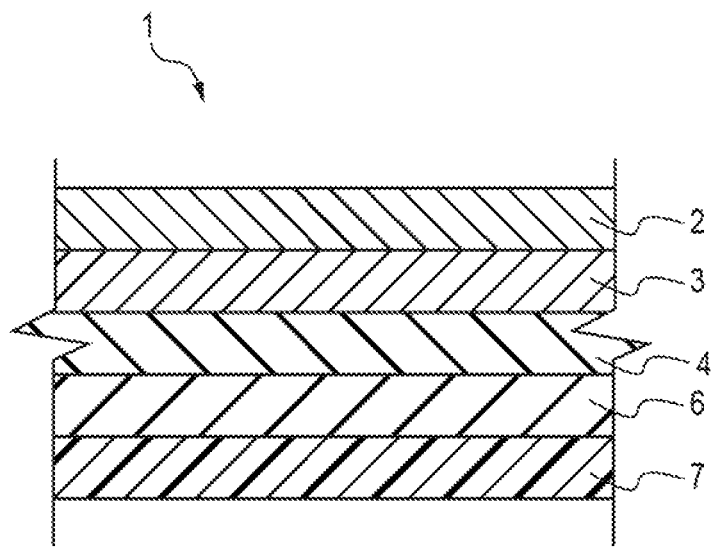
FIG. 2 is a schematic, cross sectional view of an adhesive article exposed to a polar solvent, and disposed on a substrate.

Methods for bonding an adhesive article, for example the adhesive article 1 shown in FIG. 1, to a substrate are also provided. The methods generally include contacting a polar solvent 6, such as water, to the protective layer 4 and applying the adhesive article 1 to a substrate 7, as shown in FIG. 2. While FIG. 2 shows the polar solvent 6 and the protective layer 4 to be separate layers, it will be understood that such depiction is for clarity, and in fact, the polar solvent 6 may mix with the protective layer 4 so that the two materials may not form distinct layers, but may form a single layer of tacky material for making an initial removable bond with the substrate 7.

The polar solvent 6 may be applied directly to the protective layer 4, or to the substrate 7. When applied to the substrate, the methods include contacting the polar solvent 6 to the protective layer 4 by applying the adhesive article 1 to the wetted substrate 7. A tacky material comprising a suspension/solution of amorphous vinyl alcohol polymer and/or PEO in polar solvent is thus formed. The tacky material is used to form an initial, temporary, and relatively weak bond between the adhesive article 1 and the substrate 7.

Figure 3:
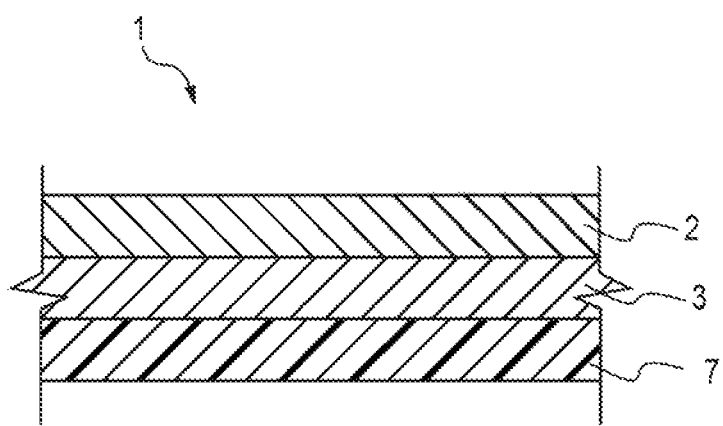
FIG. 3 is a schematic, cross sectional view of an adhesive article bonded to a substrate.

The methods may include determining if the adhesive article is misapplied to the substrate, and if it is, the methods can include repositioning the adhesive article on the substrate. As the tacky material pools and dries, the adhesive layer 3 becomes exposed for contact with the substrate 7. The exposed adhesive layer 3 can thereby form a secondary, stronger bond with the substrate 7. This is shown in FIG. 3, wherein the adhesive article 1 is bonded with the substrate 7 by the adhesive layer 3.

In one embodiment, the tacky material is not used to form an initial, removable bond with a substrate. In this embodiment, the protective layer is simply used to protect the adhesive. The adhesive article is not applied to the substrate until the tacky material pools to expose the adhesive layer. Alternatively, the polar solvent can be used to substantially wash away the protective layer. Thereafter, the exposed adhesive layer is used to form a bond with the substrate. Additional details and aspects of exemplary methods are provided herein.

Another embodiment provides a method of bonding a pressure-sensitive adhesive label to a substrate. The pressure-sensitive adhesive label includes a facestock, a PSA layer, and a protective layer covering the PSA layer. A polar solvent, such as water, is brought into contact with the protective layer to form a tacky material comprising amorphous vinyl alcohol polymer and/or PEO, and polar solvent. The tacky material provides an initial, releasable bond between the label and the substrate, which provides an opportunity for the label to be repositioned on the substrate if originally misaligned. The tacky material then pools into discrete locations at the interface between the bottle and the label, and thereby exposes the pressure-sensitive adhesive layer. In this way, the PSA layer can provide a stronger, secondary bond between the label and the bottle. These and other aspects are described in greater detail herein as follows.

Adhesive Articles

Adhesive articles incorporating the present subject matter are not particularly limited, and can include labels, tapes, wound dressings, signs, decorations, tiles, adhesive-backed hooks, adhesive connectors, sealing elements, surface protection films, graphics materials, and the like. In certain embodiments and in accordance with the present subject matter, adhesive articles comprise a facestock, an adhesive layer disposed on the facestock, and a protective layer covering the adhesive layer. In an exemplary embodiment, the adhesive article has a thickness of from about 30 microns to about 100 microns, or a thickness of about 60 microns.

The present subject matter includes individual adhesive articles that can be separately applied to a substrate, and includes semi-continuous rolled adhesive articles that can be die cut or formed into individual adhesive articles.

In one embodiment, the present subject matter provides a pressure-sensitive adhesive label comprising a printable facestock with a pressure-sensitive adhesive ("PSA") layer. A protective layer is disposed on the adhesive layer for protecting the adhesive and when activated by water or other polar solvent, can form a temporary bond with a substrate.

Facestock

In accordance with the present subject matter, an adhesive article comprises a facestock or backing material. The composition of the facestock is not particularly limited and can comprise metal, paper, polymers, textiles, glass, ceramic, wood, or combinations thereof. The configuration of the facestock is also not particularly limited. In several embodiments, the facestock is substantially two-dimensional and can comprise paper, polymeric film, foil, woven cloth, non-woven cloth, fabric, fiberglass, or a combination thereof. By "substantially two-dimensional," it is meant that the facestock has a significantly larger size in two dimensions compared to a significantly smaller size in a third dimension; for example a sheet or film. The substantially two-dimensional facestock may have an average thickness from about 10 microns to about 60 microns, or about 40 microns in the smallest dimension.

Alternatively, the facestock can comprise a three-dimensional object, such as an adhesive-backed hook, ornament, tile, or any other suitable backing material for adhesive application to a substrate.

In several embodiments, the facestock comprises a substantially two-dimensional thin polymeric elastic or flexible film material. The film may be continuous, i.e. having no perforations, apertures, or pores which extend through the thickness of the film; or may be discontinuous, i.e. having apertures extending through the thickness of the film.

The facestock may include hydrophobic polymeric material that does not substantially dissolve, solubilize, or otherwise deteriorate when contacted with water. This may be important since in several exemplary methods, adhesive articles may be exposed to water in order to activate the adhesive article.

In certain other embodiments, where the facestock includes material that may be subject to damage when exposed to water, a protective treatment or layer can be applied to the facestock to prevent such damage. The facestock may be coated with hydrophobic or water repellent lacquer including but not limited to, poly-vinylidene chloride, acrylates, polyurethane, epoxy resins, silicones, poly-tetra-fluoro-ethylene (for example, Teflon, a registered mark of DuPont, USA), poly-vinyl fluoride (for example, Tedlar, a registered mark of DuPont, USA), THV, a polymer of tetrafluoroethylene, hexafluoropropylene and vinylidene fluoride (for example, Dyneon, a registered mark of 3M, USA) or the like. In the case of a substantially two-dimensional facestock, the facestock may optionally be coated on either or both major surfaces. Alternatively, in certain other embodiments, the facestock may be silicone-free and/or fluorine free.

For industrial mechanical processing of individual adhesive articles, the facestock can comprise a continuous rolled web layer. A final layered adhesive article may be formed by depositing other component layers to the facestock. Once formed, the adhesive article can be die cut to specific dimensions to form individual adhesive layered articles, for example adhesive labels. Die cut processes may not utilize 100% of the facestock and a waste matrix component can be produced. The advantage of the present subject matter is that a release liner is not required to be utilized as part of adhesive article, and therefore any waste that may be produced will not include release liner material; and strain on the environment will be minimized.

Adhesive Layer

The adhesive layer of the present subject matter bonds the adhesive article to a substrate. As shown in FIG. 1, the adhesive layer 3 is applied to one surface of the facestock 2, and is covered by the protective layer 4. In accordance with the present subject matter, the adhesive layer is applied to at least a portion of one surface of the facestock, and the protective layer covers at least a portion of the adhesive layer.

Adhesives are typically classified in one of two categories: permanent adhesives and removable adhesives. Permanent adhesives form bonds that do not allow for the removal of an adhesive article from a substrate without considerable damage to the adhesive article or substrate, adhesive failure at the article surface, cohesive failure in the bulk of the adhesive layer, or residual transfer of the adhesive to the substrate. The bond formed by removable/temporary/repositionable adhesives is considerably lower, allowing removal of the adhesive article from the substrate even after a protracted period of contact. Removal is accomplished without significant damage to the adhesive article, adhesive layer, or substrate. Removable adhesives form a temporary bond and can be removed or repositioned without leaving significant residue on the substrate. In one embodiment, the adhesive layer forms a permanent bond with a substrate. In another embodiment, the adhesive layer forms a removable bond with a substrate.

In accordance with the present subject matter, the adhesive layer may be applied directly to the facestock, or may be applied to the facestock by using a transfer film. Depending upon the utility, the adhesive layer can be applied to a facestock or transfer film using techniques such as spraying, wire coating, knife coating, Meyer Bar coating, curtain coating, extrusion coating, gravure print coating, or the like.

The adhesive layer may be formulated so as not to chemically react or dissolve the constituents of the protective layer. The adhesive layer can be soluble or insoluble in aqueous systems. In one embodiment, the adhesive is substantially insoluble in polar solvents, such as water for example. When a polar solvent, such as water, is used to activate the adhesive article, such polar solvent may come into contact with the adhesive layer. Because the adhesive may be substantially insoluble in polar solvents, the adhesive layer will remain substantially undamaged and affixed to the facestock even upon exposure to a polar solvent. To choose an adhesive that dissolves in water may lead to undesirable consequences, wherein the adhesive layer could partially or totally dissolve; leaving a residue on the facestock and preventing optimum adhesion to the substrate. In certain applications however, it may be desirable for the adhesive layer to be soluble in aqueous systems. Therefore, the present subject matter includes water-soluble adhesive layers.

The adhesive can be disposed on a facestock in any desired configuration for a particular application. For example, the adhesive can be disposed over portions of a surface of the facestock or over an entire surface of the facestock. The coating of adhesive can be patterned, continuous, or applied as discrete islands of adhesive. The adhesive layer can have relative uniform thickness or can have a thickness that varies throughout the adhesive layer. In one embodiment, the adhesive layer has a relative uniform thickness from about 1 micron to about 10 microns, or about 8 microns.

In several embodiments, the adhesive is disposed in a continuous layer with relative uniform thickness on one entire surface of a substantially two-dimensional facestock. In another embodiment, the adhesive is disposed on a portion of one surface of a substantially two-dimensional facestock.

The adhesive can be stabilized against UV and oxidative degradation by incorporating UV stabilizers and antioxidants. Other additives, such as fillers, colorants, tackifiers, plasticizers, oils, and the like, may also be added.

The adhesive can have a glass transition temperature less than about 10° C. below use temperature, or less than about 30° C. below use temperature. As used herein, the phrase "use temperature" is the temperature at which the adhesive is normally bonded to a substrate. Use temperature is normally ambient (23° C.) but may be 0° C. or less for low temperature applications and higher than 23° C. for high temperature applications.

In one embodiment, the adhesive layer comprises a pressure-sensitive adhesive. Pressure-sensitive adhesives are adhesives that bond to a substrate with the application of pressure. Solvents, water, chemical reaction, or heat are not required to activate the adhesive. The degree of bonding strength is influenced by the amount of pressure which is used to apply the adhesive to the substrate surface. Bonding strength is also affected by substrate characteristics such as smoothness, surface energy, presence of contaminants, and the like. Pressure-sensitive adhesives are usually designed for use at room temperature (i.e. approximately 23° C.). They normally display a total or partial loss of bonding strength at low temperatures and loss of shear holding ability at high temperatures.

Pressure-sensitive adhesives exhibit viscoelastic properties, which are tailored to ensure proper adhesion. Pressure-sensitive adhesives are designed to balance their tendency to flow (adhesive forces) and their resistance to flow (cohesive forces). Pressure-sensitive adhesives form a bond to a surface because their adhesive forces are such that they flow, or wet the substrate. The bond maintains strength because the cohesive forces of the pressure-sensitive adhesive are such that they resist flow when stress is applied to the bond.

Once the substrate and the pressure-sensitive adhesive are in proximity, there are also molecular interactions, such as van der Waals forces involved in the bond, which contribute significantly to the bond strength.

Pressure-sensitive adhesives can be composed of elastomeric polymers with or without tackifiers. A variety of polymers have been used to manufacture pressure-sensitive adhesives; for example, acrylic and methacrylic ester homo- or copolymers, butyl rubber-based systems, silicones, nitriles, styrene block copolymers, ethylene-vinyl acetate, urethanes, vinyl esters and amides, olefin copolymer materials, natural or synthetic rubbers, and the like.

In one embodiment, the adhesive layer comprises a permanent pressure-sensitive adhesive. In certain aspects, the adhesive layer comprises an emulsion adhesive including a solvent and acrylic polymer. Other pressure-sensitive adhesives can be used in accordance with the present subject matter, including a polyurethane adhesive, a rubber adhesive, or the like.

In accordance with the present subject matter, the protective layer may be applied directly to the adhesive layer, or may be first applied to a transfer film and then contacted to the adhesive layer. In embodiments where a transfer film is used, upon removal of the transfer film, the protective layer will be conveyed from the transfer film to the adhesive layer. That is, the adhesive layer will retain a substantial portion of the protective layer from the transfer film due to the bond strength between the protective layer and the adhesive layer being stronger than the bond strength between the protective layer and the transfer film.

Protective Layer

In accordance with the present subject matter, adhesive articles include a protective layer. In one embodiment, the protective layer comprises poly(ethylene oxide). A suitable PEO can comprise Polyox WSR N-750, Polyox WSR N-80, or Polyox WSR N-3000 for example, provided by The Dow Chemical Company, 2030 Dow Center, Midland, Mich.

In another embodiment, the protective layer comprises an amorphous vinyl alcohol polymer. "Amorphous" indicates a condition in which polymer molecules are randomly structured with relatively low percent crystallinity, i.e. less than 50% crystallinity, as compared to crystalline or highly crystalline materials.

As shown in FIG. 1, the protective layer 4 covers the adhesive layer 3. In accordance with the present subject matter, the protective layer may cover all, or a portion, of the adhesive layer and may comprise a patterned layer having voids, or may comprise a substantially continuous layer without voids.

In accordance with the present subject matter, the protective layer covers at least a portion of the adhesive layer to protect the adhesive layer from premature exposure to a substrate or environmental contaminants such as dirt, liquids, or other elemental exposure. Inadvertent contact or exposure to environmental elements can decrease the tackiness of the adhesive layer and prevent the desired adhesion. In this way, the protective layer may take the place of conventional release liners, or supplement the use thereof, to maintain the adhesive tackiness of the adhesive layer.

The protective layer may also allow for easy handling of the adhesive article prior to application to a substrate, i.e. during lamination, converting, packaging, handling, storage, or shipping. Key attributes of the protective layer are that it must rapidly dissolve in the solvent, and it must exhibit high "wet tack" when exposed to the same dissolving solvent. In embodiments wherein amorphous PVOH is used in the protective layer, handling is improved because amorphous vinyl alcohol polymer is a solid at room temperature (i.e. approximately 23° C.) and, when dry, is a relatively rigid material that can enhance the dispensing speeds of adhesive articles in a mechanical production process, allowing for more conformability at lower caliper.

In this way, the protective layer including amorphous vinyl alcohol polymer may also provide stiffness to the adhesive article to facilitate these steps. Handling of the adhesive article can include passing the adhesive article through rollers, die cutting the adhesive article into smaller individual adhesive items, packaging or storing adhesive articles, printing on adhesive articles, and other manufacturing processes. Furthermore, amorphous PVOH is fully degradable, dissolves in water, and is considered non-toxic. In summary, amorphous vinyl alcohol polymers (e.g. Nichigo G-Polymer®) contemplated for use herein have excellent extrusion processability; multi-layer structures with including amorphous vinyl alcohol polymers may be produced by extrusion; extrusions have excellent high barrier properties, excellent formability, and extrusion products show excellent dissolution in water. For example, amorphous vinyl alcohol (e.g. Nichigo G-Polymer®) may be extruded over a wider processing window than PVOH because of the larger difference between the melting point and decomposition temperature of amorphous vinyl alcohol when compared with PVOH; the melting point of Nichigo G-polymer is 140-190° C. (284-373° F.) while the melting point of PVOH is 227° C. (441° F.). It is very challenging to extrude PVOH because its decomposition temperature is close to the melting temperature. Additional comparisons between the general properties of amorphous vinyl alcohol polymers (e.g. Nichigo G-polmer) and PVOH include; the glass transition temperature (Tg) of Nichigo G-polymer is 80° C. (176° F.) while the Tg of PVOH is 72° C. (162° F.) and the average level of crystallinity of Nichigo G-polymer is about 10% or less while that of PVOH is 48%.

In yet another embodiment, the protective layer 4 is a vinyl alcohol polymer having an average level of crystallinity of less than about 35%, less than about 25%, or less than about 20%, or 10% or less, and is therefore considered a highly amorphous vinyl-alcohol copolymer resin (HAVOH).

The highly amorphous vinyl alcohol polymer can comprise or consist of a polyvinyl alcohol homopolymer, a polyvinyl alcohol copolymer, an acetoacetic ester group-containing polyvinyl alcohol copolymer, a polyvinyl alcohol copolymer which has been partially acetalized, a polyvinyl alcohol polymer copolymer which comprises vinyl alcohol polymer units having a 1,2-diol structure, or any combination thereof.

In one embodiment the highly amorphous polyvinyl alcohol copolymer can be fully or partially saponified, wherein all or some of the ester groups in the polymer have been substituted with hydroxyl groups. The degree of saponification of the highly amorphous polyvinyl alcohol copolymer can be from about 50 mol % to about 98 mol %.

An example of a suitable highly amorphous polyvinyl alcohol for use in the barrier layer 30 is Nichigo G-Polymer, including grades AZF8035W, OKS-8089, OKS-8041, OKS-6026, OKS-1011, OKS-8049, OKS-1028, OKS-1027, OKS-1109, OKS-1081, and OKS-1083 provided by Nippon Gohsei Synthetic Chemical Industry, Osaka Fukoku Seimei Building, 2-4, Komatsubara-cho, Kita-ku, Osaka 530-0018, Japan.

Nichigo G-Polymer is believed to be a resin composition, which comprises: (A) a polyvinyl alcohol (PVOH) resin having a 1,2-diol structural unit represented by the following general formula (1):

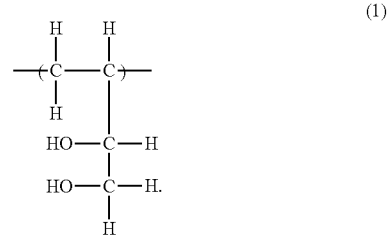

and having a saponification degree of 80 to 97.9 mole %; and (B) an alkylene oxide adduct of a polyvalent alcohol polymer containing 5 to 9 moles of an alkylene oxide per 1 mole of the polyvalent alcohol polymer. Nippon Gohsei also refers to Nichigo G-Polymer as butenediol vinyl alcohol (BVOH).

Figure 5:
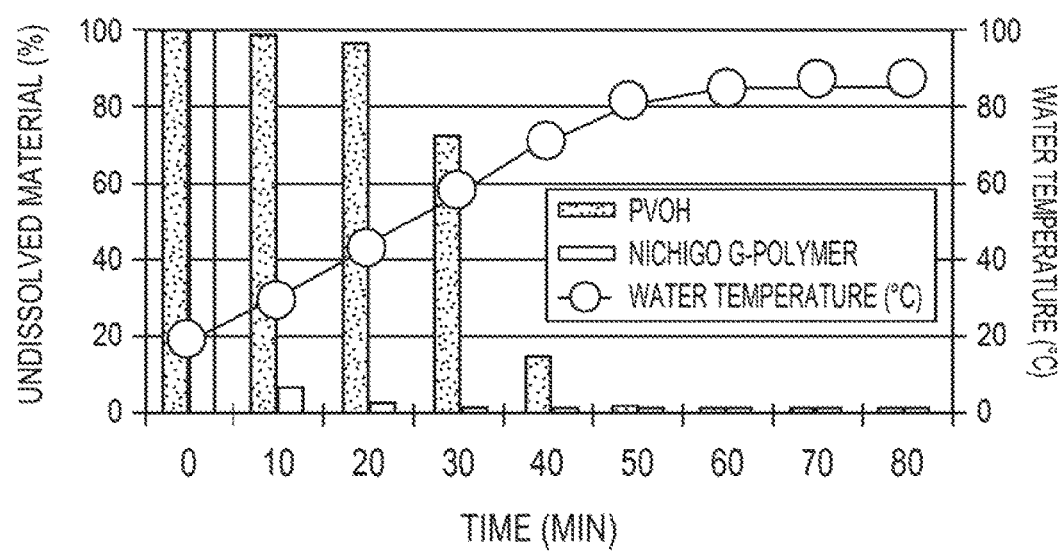
FIG. 5 is a graph showing water solubility of a highly amorphous polyvinyl alcohol compared with a conventional polyvinyl alcohol.

FIG. 5 shows water solubility performance characteristics according to water temperature and time of Nichigo G-polymer at 6% concentration, compared with fully saponified polyvinyl alcohol (PVOH) at 6% concentration. As can be seen, Nichigo G-polymer dissolves much quicker and at lower temperatures in water than the fully saponified PVOH.

A method to quantify the "wet tack" strength of a material is to test the coefficient of friction (CoF), as measured according to ASTM D1894, of the coating against various surfaces. A film sample coated with an amount of G-polymer (thickness of about 4-6 microns) was mounted to a 200 g sled. A target surface (PET, HDPE, and glass) was placed underneath the sled to measure the resistance of the coating against that material. The initial measurement was performed "dry" to provide a baseline. The pairing was tested again, but on the second attempt, a light mist of water was applied onto the target surface, just ahead of the sled, in the path of the coated sample. As the sample traverses across the solvent (in this case water), if there is any wet tack tendencies, the friction resistance will immediately increase. Once the water was applied, the sled was immediately activated. It took less than one second for the water to activate the "Wet Tack" of the G-polymer represented as the "Wet" CoF readings shown in Table 1. That is, it took less than one second for the front end of the G-polymer coated material to make contact with the water and for the instrument to consequently display a "Wet" CoF measurement. Table I shows the impact of using water as a polar solvent against select grades of G-Polymer.

TABLE 1

Wet Tack Impact on the Coefficient of Friction

| Grade | PET Kinetic COF | | | | HDPE Kinetic COF | | | | Glass Kinetic COF | | | |
|---|---|---|---|---|---|---|---|---|---|---|---|---|
| | Dry | Wet | Increase | % | Dry | Wet | Increase | % | Dry | Wet | Increase | % |
| OKS-1024 | 0.519 | 0.642 | 0.123 | 24% | 0.225 | 0.354 | 0.129 | 57% | 0.286 | 0.234 | −0.052 | −18% |
| OKS-8089 | 0.870 | 4.000 | 3.130 | 360% | 0.126 | 3.097 | 2.971 | 2358% | 0.292 | 2.594 | 2.302 | 788% |
| OKS-8041 | 0.060 | 4.000 | 3.940 | 6567% | 0.102 | 4.170 | 4.068 | 3988% | 0.307 | 4.000 | 3.693 | 1203% |
| AFZ8035 | 0.086 | 3.039 | 2.953 | 3434% | 0.041 | 3.775 | 3.734 | 9107% | 0.163 | 3.954 | 3.791 | 2326% |

The highly amorphous vinyl alcohol polymer is a biodegradable thermoplastic that can be extruded, is relatively transparent to visible light with a percent haze of the polymer less than 30%, has a relatively low level of UV light transmittance of less than 15%, and is capable of dissolving in water.

Highly amorphous vinyl alcohol polymer is soluble in water, but is non-tacky when dry and under conditions of less than 65% relative humidity. Therefore, in one aspect, the protective layer comprises a dry, non-tacky amorphous vinyl alcohol polymer. As used herein, "dry" means that solvent (e.g. water) content is substantially removed from the protective layer. In a dry, non-tacky state, the protective layer can act as a protective covering for the adhesive layer and prevent the adhesive article, or portions thereof, from prematurely bonding with a surface or being contaminated.

When exposed to a polar solvent, such as water, the constituents of the protective layer may at least partially dissolve and/or be suspended in the polar solvent. At the proper thickness on an adhesive article, the constituents of the protective layer can be suspended in water to provide a tacky material for forming an initial bond between a facestock and a substrate. While not being bound to any theory, it is believed the initial bond is provided by the cohesive forces of the tacky material. Where the adhesive layer is solvent-based, the tacky material may provide the initial adhesion until the tacky material pools or dries. Where the adhesive layer is water-based, the tacky material may provide initial adhesion until the tacky material pools or dries, or components thereof are absorbed, dissolved, or otherwise mixed with the adhesive layer.

This initial adhesion provided by the tacky material, comprising for example amorphous PVOH and water, is relatively weak when compared to that provided by the adhesive layer. The weak adhesion allows an adhesive article to be removably bonded with a substrate and optionally repositioned on the substrate. This is particularly useful in labeling methods in order to reclaim mislabeled substrates and to reposition the adhesive label. Once the tacky material begins to pool into discrete locations at the adhesive article/substrate interface, the underlying adhesive layer is gradually exposed to the substrate to provide a stronger bond, e.g. a permanent bond, between the facestock and the substrate.

As the tacky material pools together at discrete locations at the interface between the substrate and the adhesive article, the bond between the adhesive article and the substrate transitions from the weak initial bond provided by the tacky material, to the stronger, more durable bond provided by the adhesive layer.

In one embodiment, the protective layer may be formed by combining amorphous vinyl alcohol polymer and/or PEO with a polar solvent such as water, to form a protective composition, wherein the amorphous vinyl alcohol polymer and/or PEO may be in powder form and dissolved and/or suspended in the polar solvent. The protective composition may also include one or more optional additives, such as glycerin for example, to enhance certain characteristics of the protective composition or protective layer. Glycerin can be included to enhance moisture receptivity. Additives can be included to increase the viscosity of the protective composition for a particular coating application method, such as curtain coating to produce thicker layers greater than 4 g/m$^2$ for example. A barrier composition having a relatively lower viscosity can be used for rotogravure or direct coating methods. Other optional additives can be included in the barrier composition as desired for adjusting characteristics of the barrier composition or barrier layer, such as the evaporation rate, viscosity, wettability, rheology, color, and the like. Where both PEO and amorphous vinyl alcohol polymer are included in the protective composition, the PEO can be used to adjust the viscosity of the protective composition.

The protective composition can be applied to the adhesive layer, or to a transfer film, and dried to substantially remove the solvent content from the protective composition, thereby forming the protective layer. If the protective layer is formed on a transfer film, then the protective layer is brought into contact with the adhesive layer and the transfer film is removed, leaving the protective layer covering the adhesive layer.

The amounts of amorphous vinyl alcohol polymer and/or PEO, and water in the protective composition are not particularly limited by the present subject matter, so long as the protective layer once formed, is of proper thickness and is capable of providing sufficient protection as desired for the adhesive layer.

In this regard, the highly amorphous vinyl alcohol polymer and/or PEO can be included from about 75 weight percent (wt %) to about 100 wt % of the total combined weight of the highly amorphous vinyl alcohol polymer and/or PEO and optional additive(s); and the additive(s) can be included from about 0 wt % to about 25 wt % of the total combined weight of highly amorphous vinyl alcohol polymer and/or PEO and additive(s). The amount of water is not particularly limited and can be added in an amount in order to achieve the desired viscosity of the protective composition as appropriate for certain coating techniques used for forming the protective layer. For example, the protective composition may have relatively high viscosity for curtain coating, and a relatively low viscosity for spray coating. In other embodiments, an amorphous vinyl alcohol polymer and/or PEO may be melted and extruded by casting into a film to form the protective layer.

The average thickness of the dry protective layer, which may be formed by substantially removing the water content from protective composition, is not particularly limited by the present subject matter. The protective layer may be relatively thin as compared to other layers in the adhesive article, yet still be capable of maintaining adequate protection of the adhesive layer from exposure to environmental contamination.

The thickness of the protective layer will affect certain properties of the adhesive article and will determine the amount of polar solvent needed to activate the adhesive article, i.e. dissolve/suspend the constituents of the protective layer. A thicker protective layer may satisfactorily protect the adhesive layer from environmental contamination, but may require more polar solvent, more time, or additional operations to adequately activate the adhesive article, and thus requires more time before the adhesive layer can form a bond with the substrate. However, a thicker protective layer provides a longer time to reclaim a mislabeled substrate.

A thinner protective layer may require less polar solvent to activate the adhesive article, require less time to dry the tacky material, and thus more quickly exposes the adhesive layer. However, a thinner protective layer may not adequately protect the adhesive layer from environmental contamination, and may provide less time to reclaim a mislabeled substrate. Furthermore, the protective layer may be so thin that when dissolved/suspended, it does not provide enough initial adhesion to keep the adhesive article attached to a substrate, or otherwise may not adequately cover the adhesive layer to allow for repositioning of the adhesive article.

In one embodiment, the dry protective layer has an average thickness ranging from about 0.075 µm to about 4.65 µm or higher, or a coating weight ranging from about 0.1 g/m$^2$ to about 6 g/m$^2$ or higher. Average thicknesses lower than 0.075 µm, or coating weights lower than 0.1 g/m$^2$, may not offer sufficient protection for the adhesive layer. In one aspect, the protective layer is present at an average thickness of about 0.75 µm to about 1.55 µm, and particularly at about 0.93 µm; or a coating weight from about 1 g/m$^2$ to about 2 g/m$^2$, and particularly at about 1.2 g/m$^2$. The coating weights or thicknesses, as the case may be, of the protective layer can be varied in relation to the tackiness of the underlying adhesive. That is, thicker coating weights can be used when strongly tacky adhesives are used, and conversely, thinner coating weights can be used when weakly tacky adhesives are used.

As described, the protective layer may be formed from drying the protective composition. However, the present subject matter includes forming the protective layer from a powder composition that is substantially free of water or other polar solvent. In this aspect, the amorphous vinyl alcohol polymer and/or PEO may be in powder form and applied to the adhesive layer for example, by sifting, sprinkling, powder spraying, electrostatic coating, fluidized bed coating, or the like. In this aspect, the powder composition may also include non-aqueous additives, such as fillers, polymer resins, pigments, flow agents, or the like.

Other coating techniques can be used including lamination, extrusion, deposition, spray coating, dip coating, and the like.

The protective layer may comprise other materials such as polyvinyl alcohol (PVOH), ethyl cellulose, polyvinylpyrrolidone, hydroxypropyl methylcellulose, hydroxypropyl cellulose, polymerized rosin, polyethylene glycol, maltodextrins, sodium alginate, pectin, gelatin, starch, pullulan, polyvinyl acetate (PVA), and the like. Further, the protective layer may include additives such as lamellar fillers dispersed therein or may comprise a crystalline or semi-crystalline PVOH that is partially or fully hydrolyzed, or combinations of a crystalline, semi-crystalline, and amorphous PVOH.

Optional Layers or Packaging

The adhesive article of the present subject matter can include, or be protected by other layers or packaging as desired. In one embodiment, a protective layer or protective packaging is used for preventing the protective layer from being exposed to water or other polar solvent, or from being exposed to conditions above 65% relative humidity. In this way, the protective layer can be maintained in a dry, non-tacky state during shipment or storage, and before use.

In another embodiment, the adhesive article includes indicia that may comprise printed indicia on the facestock or other layers of the adhesive article for providing information about the adhesive article or about a substrate to which the adhesive article is adhered. Furthermore, the adhesive article can also include printing receptive layers, hydrophobic layers, additional film layers, or the like.

Methods

The present subject matter provides methods of bonding an adhesive article to a substrate, methods of making an adhesive article, and methods of adhering and repositioning a misapplied adhesive article to a substrate.

Figure 4:
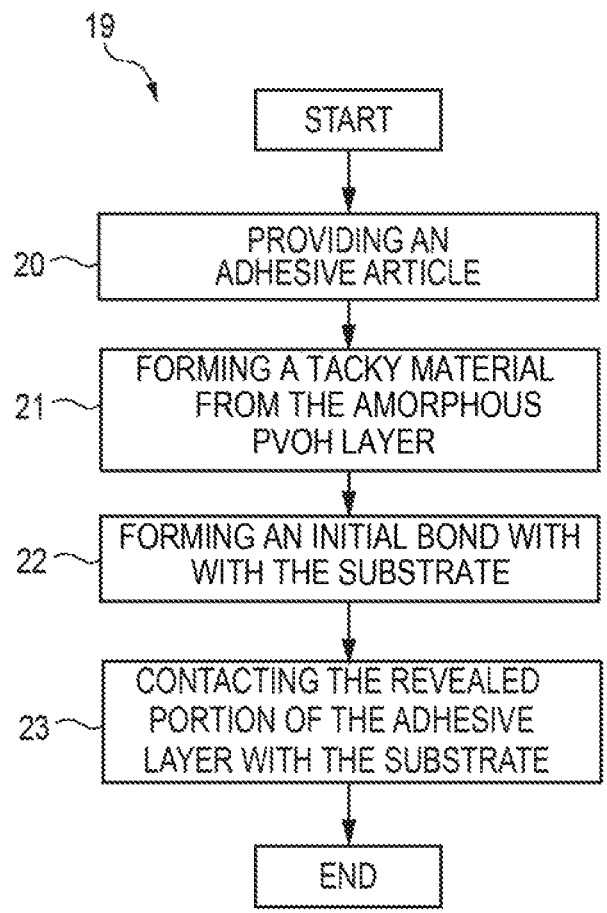
FIG. 4 is a flowchart of an exemplary method for using an adhesive article in accordance with the subject matter.

One exemplary method is shown in FIG. 4. The method 19 starts by providing an adhesive article, shown as operation 20. The method 19 includes forming a tacky material from the protective layer, shown as operation 21; forming an initial bond with the substrate, shown as operation 22; and contacting the revealed portion of the adhesive layer with the substrate, shown as operation 23 to end the method 19.

In operation 20, an adhesive article is provided comprising a facestock, an adhesive layer disposed on at least a portion of the facestock, and a protective layer disposed on the adhesive layer. The adhesive article can comprise or make up a portion of a label, tape, wall hook, etc. that includes a facestock that is either substantially two-dimensional or is a three-dimensional object. In one aspect the facestock is substantially two-dimensional.

The substrate to which the label is adhered is not particularly limited and can comprise a container, surface, material, human skin, etc. that is flat or contoured, and smooth or rough. A practical consideration is the interaction of the substrate with the adhesive layer. In this regard, the adhesive layer should provide a sufficient bond to the substrate for a chosen application. The type of substrate will affect the choice of the composition for the adhesive layer and the type of polar solvent used to dissolve/suspend the constituents of the protective layer. In one aspect, the substrate comprises a bottle.

The dry protective layer, which is substantially non-tacky, acts in place of a release liner for protecting the adhesive. In this aspect, the protective layer can be directly applied to the adhesive layer. The facestock can be rolled or otherwise stacked upon itself before the end use. To expose the protective layer, the facestock simply can be unrolled or unstacked.

Also contemplated by the present subject matter is an article and method where the adhesive article comprises a layered product in a roll. In this embodiment, the facestock is used as a transfer film for the protective layer, wherein amorphous PVOH and/or PEO is coated on the facestock on the side opposite from the adhesive layer. As the rolled layered product is unwound, the protective layer will release from the facestock and remain in contact with the adhesive layer to cover the adhesive layer.

In operation 21, a tacky material is formed from the protective layer by bringing water or other polar solvent into contact with the protective layer. In this operation, the protective layer may be at least partially dissolved in the polar solvent and/or suspended in the polar solvent. Water may used as the polar solvent and the water can be of any type. Liquid water that has been purified by distilling, deionization, or by reverse osmosis may be used. The water can be applied to the substrate, or directly to the protective layer.

A portion of operation 21 is depicted in FIG. 2, showing a linerless water-activatable adhesive article 1 comprising a facestock 2 with an adhesive layer 3 disposed thereon. The protective layer 4 is shown to have been exposed to a polar solvent 6, and applied to a substrate 7. The amount of the polar solvent 6 used in operation 21 is such that the protective layer 4 is not washed away from the adhesive layer 3, but rather is suspended and/or dissolved to form a tacky material that provides an initial bond to the substrate 7. The protective layer 4 may partially dissolve or completely dissolve and/or become suspended in the polar solvent. Regardless of the proportion of the protective layer 4 that is dissolved or suspended in the polar solvent in operation 22, the adhesive layer 3 should be exposed by pooling of the tacky material, such that a sufficiently strong bond can be made with the substrate 7 as desired.

In operation 22, an initial, removable adhesive bond is formed with the substrate with the tacky material. The bond may be formed by contacting the tacky material to the substrate. The tacky material provides an initial tack that removably bonds the adhesive article to the substrate. This relatively weak, initial bond allows for reclaiming of substrates, such as bottles, that have an adhesive article that is out of a desired alignment or otherwise misapplied to the substrate, and allows for repositioning the adhesive article on the substrate.

In operation 23, the revealed portion of the adhesive layer is contacted with the substrate. This is depicted in FIG. 3, showing a schematic, cross sectional view of facestock 2 bonded to a substrate 7 by the adhesive layer 3. FIG. 3 relates to a situation where the tacky material has pooled to expose the adhesive layer 3, thereby allowing the adhesive layer 3 to form a bond with the substrate 7. For clarity, the pooled tacky material is not depicted in FIG. 3. However, when the adhesive layer 3 makes a bond with the substrate 7, it will be understood that the tacky material or the dried constituents thereof may nevertheless be present at the interface between the adhesive article 1 and the substrate 7.

While not being bound to any particular theory, it is believed that the tacky material pools together to form small colloid particles at the interface between the substrate and the adhesive article, and that these colloid particles leave enough functionality in the adhesive layer to form a relatively strong bond with the substrate. Such bond between the adhesive and the substrate may comprise a permanent bond. When the adhesive layer includes solvent-based adhesives, the pools of tacky material may subsequently dry, thereby leaving dry islands of amorphous PVOH and/or PEO at the interface. When water-based adhesive are used, the tacky material, or portions thereof such as the solvent, may be absorbed by the adhesive layer.

Operation 23 can be combined with, or performed simultaneously with, operation 21 and 22. For example, a polar solvent can be brought into contact with the protective layer by applying the polar solvent to the substrate, and bringing the protective layer in contact with the wetted substrate. The polar solvent on the substrate will dissolve and/or suspend the constituents of the protective layer, creating a tacky material that forms an initial, temporary bond with the substrate. As the tacky material pools at the interface, the adhesive layer will be exposed to form a relatively strong bond with the substrate. In this way, operations 21-23 can be initiated simultaneously.

Alternatively in operation 21, a polar solvent can be applied directly to the protective layer to form the tacky material. In any embodiment, the polar solvent can be applied to the substrate or to the protective layer by any conventional means such as spraying, rolling, painting, dipping, microencapsulation, printing, spin coating, vapor coating, and the like, or a combination thereof. In one embodiment, the polar solvent is sprayed onto a portion of the substrate.

In another embodiment, microencapsulation techniques are used to contact a polar solvent to the protective layer. In this embodiment, a polar solvent is disposed in tiny microcapsules, which may be configured to release the polar solvent upon an external trigger. Such trigger may include for example, the application of pressure, heat, UV radiation, or the like to the adhesive article for rupturing the microcapsules and releasing the polar solvent therefrom. The microcapsules can be integrated into or on the adhesive layer, the protective layer, or by other means so that the polar solvent, once released from the microcapsules, will suspend and/or dissolve the protective layer to create a tacky material for providing a temporary, relatively weak, releasable bond.

In several embodiments where the polar solvent is applied to the substrate, the wetted portion of the substrate does not have to be entirely covered by the facestock; and conversely, the entire portion of the substrate covered by the facestock does not have to be wetted.

As the tacky material pools into discrete locations at the adhesive article/substrate interface, the adhesive layer may increasingly become exposed over time. The interface between the adhesive layer and the substrate will gradually increase and the interface between the tacky material and the substrate will decrease. The adhesive layer may then form a stronger, secondary bond with the substrate. In one aspect, the adhesive layer forms a permanent bond with the substrate.

Other additional operations can be incorporated into the method including heating, cooling, and/or repositioning operations. A heating operation can be incorporated to increase the rate at which the protective layer is dissolved by a polar solvent. A cooling operation can decrease the rate at which the protective layer dissolves in a polar solvent. A repositioning operation can be used to reclaimed substrates with misaligned adhesive articles and to properly align the adhesive articles on the substrates.

The operations of the methods can be tailored for each individual scenario and can be carried out by machine such as by a mechanized labeling machine, or can be carried out by hand utilizing individual adhesive articles.

In one embodiment as previously discussed herein, the protective layer is not used to form tacky material for forming an initial bond with a substrate. Rather, the protective layer is substantially washed away or pooled with the polar solvent, and the adhesive article is bonded to the substrate only with the exposed adhesive layer.

Another method is provided for making an adhesive article and includes providing a facestock; applying a layer of adhesive to the facestock; and applying a layer comprising amorphous vinyl alcohol polymer and/or PEO to the layer of adhesive. The amorphous vinyl alcohol polymer and/or PEO can be applied as a solution, suspension, or as a dry powder. If applied as a solution or suspension, the method can include a drying operation to substantially remove the solvent so that the formed protective layer is non-tacky and can be used in place of a release liner to protect the adhesive layer.

The amorphous vinyl alcohol polymer and/or PEO can be applied by techniques including spray coating, dipping, painting, roll coating, curtain coating, bar coating, gravure coating, or the like. The protective layer can be continuous layer without voids or may be a layer including voids, such as a patterned layer of amorphous vinyl alcohol polymer.

In other embodiments, an amorphous vinyl alcohol polymer and/or PEO may be melted and extruded by casting, or blown into a film to form the protective layer.

A method of adhering and repositioning a misapplied adhesive article to a substrate is also provided. The adhesive article is as previously described herein and the method includes suspending and/or at least partially dissolving a protective layer with a polar solvent to form a tacky material. The method includes contacting the tacky material to the substrate to form a temporary and releasable bond between the adhesive article and the substrate. The method includes determining an alignment of the adhesive article with respect to the substrate. The alignment is then compared to a desired alignment of the adhesive article with respect to the substrate. If it is determined that the adhesive article is misaligned, then the method includes repositioning the adhesive article on the substrate. Repositioning of the adhesive article on the substrate may be performed while the tacky material is providing the initial bond.

As the tacky material pools at discrete locations at the interface between the adhesive article and the substrate, the adhesive layer is gradually exposed to form a secondary, more durable bond with the substrate.

Substrates

In accordance with the present subject matter, an adhesive article or facestock is adhered to a substrate. The substrate is not particularly limited by the present subject matter and can include any substrate to which an adhesive article can be adhered. The present subject matter provides an adhesive article that can be repositioned on a substrate if initially misapplied.

In one embodiment, the substrate comprises a container. In this embodiment, the adhesive article can include indicia for identifying the contents of the container. In one aspect, the container comprises a bottle and the adhesive article comprises a label including indicia. The label has an adhesive layer for permanently adhering the label to the bottle. The label may be applied to the bottle by methods described herein. Accordingly, amorphous polyvinyl alcohol and/or PEO may be at an interface between the bottle and the label, in either a dry state, included in a colloid, or mixed with the adhesive layer.

While not being bound to any particular theory, it is believed that if the adhesive layer is water based, then the suspended/dissolved constituents of the protective layer may mix with the adhesive layer. If the adhesive layer is solvent based, it is believed that the suspended/dissolved constituents may pool at discrete locations at the bottle-label interface, and may eventually dry out.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter addresses many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:
1. A water-activatable adhesive article comprising:
a facestock,
an adhesive layer disposed on the facestock, and
a water-soluble, film-forming protective layer covering at least a portion of the adhesive layer, wherein the protective layer comprises an amorphous vinyl alcohol polymer with less than 50% crystallinity,
wherein the protective layer is in a dry form and is non-tacky, and
wherein upon contacting a solvent to the protective layer, the solvent and the protective layer form a tacky material capable of forming a temporary and releasable adhesive bond between the adhesive article and a substrate and the covered portion of the adhesive layer is at least partially exposed.

2. The adhesive article of claim 1, wherein the adhesive article is free of a release liner covering the adhesive layer.

3. The adhesive article of claim 1, wherein the amorphous vinyl alcohol polymer comprises a resin composition including a polyvinyl alcohol resin having a 1,2-diol structure of formula (1):

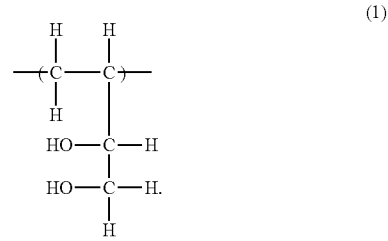

and an alkylene oxide adduct of a polyvalent alcohol polymer containing 5 to 9 moles of an alkylene oxide per 1 mole of the polyvalent alcohol polymer.

4. The adhesive article of claim 3, wherein the polyvinyl alcohol resin has a saponification degree of 80 mole % to 97.9 mole %.

5. The adhesive article of claim 1, wherein the amorphous vinyl alcohol polymer has an average level of crystallinity of less than about 35%.

6. The adhesive article of claim 1, wherein the solvent is water.

7. The adhesive article of claim 1, wherein the adhesive layer comprises a pressure sensitive adhesive.

8. The adhesive article of claim 7, wherein the pressure sensitive adhesive comprises an emulsion-acrylic adhesive.

9. The adhesive article of claim 1, wherein the facestock is selected from the group consisting of paper, a polymeric film, foil, woven cloth, non-woven cloth, fiberglass, and combinations thereof.

10. The adhesive article of claim 1, wherein the facestock includes printed indicia.

11. The adhesive article of claim 1, wherein the dry protective layer has an average thickness ranging from 0.075 µm to 4.65 µm.

12. The adhesive article of claim 1, wherein the dry protective layer has an average thickness ranging from 0.75 µm to 1.55 µm.

13. The adhesive article of claim 1, wherein the dry protective layer comprises a patterned layer having voids.

14. The adhesive article of claim 1, wherein the dry protective layer comprises a substantially continuous layer without voids.

15. The adhesive article of claim 1, wherein the amorphous polyvinyl alcohol has an average level of crystallinity of less than about 25%.

16. The adhesive article of claim 1, wherein the amorphous polyvinyl alcohol has an average level of crystallinity of less than about 20%.

17. The adhesive article of claim 1, wherein the amorphous polyvinyl alcohol has an average level of crystallinity of less than about 10%.

18. The adhesive article of claim 1, wherein the amorphous polyvinyl alcohol comprises an acetoacetic ester group-containing polyvinyl alcohol copolymer.

19. The adhesive article of claim 1, wherein the amorphous polyvinyl alcohol comprises a partially acetalized polyvinyl alcohol copolymer.

20. The adhesive article of claim 1, wherein the amorphous polyvinyl alcohol comprises butenediol vinyl alcohol (BVOH).

21. The adhesive article of claim 1, wherein the dry protective layer further comprises poly(ethylene oxide).

22. The adhesive article of claim 1, wherein the dry protective layer further comprises glycerin.

23. The adhesive article of claim 1, wherein the dry protective layer further comprises an at least partially hydrolyzed crystalline or semi-crystalline polyvinyl alcohol.

24. A method for bonding the water-activatable adhesive article of claim 1 to a substrate, the method comprising:
    contacting a polar solvent to the protective layer to expose at least a portion of the adhesive layer; and
    bonding the adhesive article to the substrate with the exposed portion of the adhesive layer.

25. The method of claim 24, wherein the adhesive article is free of a release liner covering the adhesive layer.

26. The method of claim 24, wherein the amorphous vinyl alcohol polymer comprises a resin composition including a polyvinyl alcohol resin having a 1,2-diol structure of formula (1):

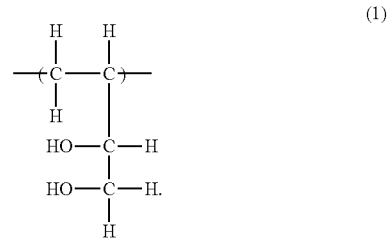

and an alkylene oxide adduct of a polyvalent alcohol polymer containing 5 to 9 moles of an alkylene oxide per 1 mole of the polyvalent alcohol polymer.

27. The adhesive article of claim 26, wherein the polyvinyl alcohol resin has a saponification degree of 80 mole % to 97.9 mole %.

28. The method of claim 24, wherein the exposed portion of the adhesive layer permanently bonds the adhesive article to the substrate.

29. The method of claim 24, wherein the polar solvent comprises water.

30. The method of claim 24, wherein contacting includes applying the polar solvent directly to the protective layer.

31. The method of claim 24, wherein contacting includes applying the polar solvent to a surface of the substrate and bringing the protective layer into contact with the surface.

32. The method of claim 24, wherein the protective layer is at least partially dissolved by the polar solvent.

33. The method of claim 24, wherein the protective layer is suspended in the polar solvent.

34. The method of claim 24, wherein the adhesive layer comprises an emulsion-acrylic adhesive.

35. The method of claim 24, wherein the adhesive article comprises a label including indicia.

36. A method for adhering the water-activatable adhesive article of claim 1 to a substrate, the method comprising;
    applying a polar solvent to the protective layer to form a tacky material comprising the polar solvent and the amorphous vinyl alcohol polymer;
    contacting the tacky material to the substrate to form a temporary and releasable bond between the adhesive article and the substrate;
    determining an alignment of the adhesive article with respect to the substrate compared to a desired alignment; and
    repositioning the adhesive article on the substrate if the adhesive article is determined to be misaligned with respect to the desired alignment.

37. The method of claim 36, wherein applying a polar solvent to the protective layer exposes at least a portion of the adhesive layer, the method further comprising contacting the exposed portion of the adhesive layer to the substrate to thereby bond the adhesive article to the substrate.

38. The method of claim 37, wherein the exposed portion of the adhesive layer permanently bonds the adhesive article to the substrate.

39. The method of claim 36, wherein the adhesive article comprises a label including indicia.

40. The method of claim 36, wherein the adhesive article is free of a release liner covering the adhesive layer.

41. The method of claim 36, wherein the amorphous vinyl alcohol polymer comprises a resin composition including a polyvinyl alcohol resin having a 1,2-diol structure of formula (1):

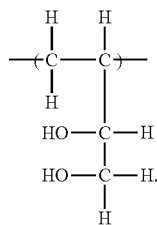 (1)

and an alkylene oxide adduct of a polyvalent alcohol polymer containing 5 to 9 moles of an alkylene oxide per 1 mole of the polyvalent alcohol polymer.

42. The method of claim 41, wherein the polyvinyl alcohol resin has a saponification degree of 80 mole % to 97.9 mole %.

43. The method of claim 36, wherein the adhesive layer comprises a pressure-sensitive adhesive.

44. The method of claim 43, wherein the pressure-sensitive adhesive comprises an emulsion-acrylic adhesive.

45. The method of claim 36, wherein the polar solvent is applied directly to the protective layer.

46. The method of claim 36, wherein the polar solvent is applied to the substrate and the protective layer is contacted to the polar solvent on the substrate.

47. The method of claim 36, wherein the polar solvent comprises water.

48. The method of claim 36, wherein applying is performed by spray coating, roll coating, dip coating, painting, printing, spin coating, micro encapsulation, vapor coating, or a combination thereof.

49. A method of making the water-activatable adhesive article of claim 1, the method comprising:
providing the facestock;
applying the adhesive layer to the facestock;
forming the dry protective layer on the layer of adhesive.

50. The method of claim 49, wherein forming includes dissolving the amorphous vinyl alcohol polymer in a polar solvent to form a solution, applying the solution to the layer of adhesive, and drying the solution to form the protective layer.

51. The method of claim 50, wherein the solution is applied by curtain coating, roll coating, spray coating, or combinations thereof.

52. The method of claim 49, wherein forming includes applying the amorphous vinyl alcohol polymer as dry powder to the layer of adhesive.

53. The method of claim 49, wherein forming includes applying the amorphous vinyl alcohol polymer as an extruded film to the layer of adhesive.

* * * * *